United States Patent [19]

de Vecchis et al.

[11] 4,237,687
[45] Dec. 9, 1980

[54] OPTICAL FIBRE LAYING HEAD FOR CABLE PRODUCTION

[75] Inventors: Michel de Vecchis; Jean-Pierre Hulin, both of Paris, France

[73] Assignee: Societe Lignes Telegraphiques et Telephoniques, Paris, France

[21] Appl. No.: 16,385

[22] Filed: Mar. 1, 1979

[51] Int. Cl.³ .......................... D07B 5/00; D07B 3/00
[52] U.S. Cl. ......................................... 57/361; 57/13; 57/352
[58] Field of Search .......................... 57/3, 6, 9, 13, 17, 57/18, 249, 352, 361; 350/96.23, 96.24, 96.29

[56] References Cited

U.S. PATENT DOCUMENTS

| | | | |
|---|---|---|---|
| 2,501,457 | 3/1950 | Thelin | 57/9 X |
| 4,112,660 | 9/1978 | Ferrentino et al. | 57/352 X |
| 4,129,468 | 12/1978 | Knab | 57/13 X |

Primary Examiner—Donald Watkins
Attorney, Agent, or Firm—Robert A. Ostmann

[57] ABSTRACT

A head for laying optical fibres in a helically grooved cable core consists of a freely rotating mount assembly carrying fibre guides inclined on the axis of travel of the core with an angle smaller than 45°. The fibre guides are elastic hollow tubes ended by a bevel maintained on the bottom of the associated groove. An optical control unit is provided for correct positioning of the mount when starting to lay.

5 Claims, 7 Drawing Figures

OPTICAL FIBRE LAYING HEAD FOR CABLE PRODUCTION

BACKGROUND OF THE INVENTION

The present invention concerns the manufacture of optical transmission cable elements made of a mechanically supporting core surrounded by a dielectric coating with helical grooves in which optical fibres are freely laid and more particularly a device for laying the optical fibres in the grooves. The present invention is directed to the simultaneous laying of one optical fibre in each of the grooves in a structure of general cylindrical form of a type such as described in French Pat. No. 2,358,666 filed on Dec. 30, 1975 and U.S. Patent Application Ser. No. 877,872 filed on Feb. 15, 1978 for: "Cable incorporating optical fibres".

BRIEF SUMMARY OF THE INVENTION

The optical fibre cable layer consists of a set of resilient capillary fibre guides each bearing at a tapered end on the bottom of each groove and maintained fast within a light mount which is rotatable without friction in relation to the grooved structure, the said fibre guides being at an angle of less than 45 degrees to the direction of travel. In some production lines, helical laying is obtained by means of a stationary tool and a rotating core. In others, the grooved core is driven longitudinally and the laying station is rotated. The invention provides additional means which provide angular control of the mount in dependence upon the rotating drive at the laying station. The use of resilient guides penetrating into the grooves renders possible an effective laying of the fibre into the grooves without tension on said fibre. The absence of friction between the guide mount of the laying head and a fixed holder enables the laying head to follow any rotational movement of the core and the irregularities of the grooves without any stress being imposed on the fibres, so that laying can be carried out under production conditions and does not require any special laboratory care.

The resilience of the guides makes it possible to use the same laying head for different cores of substantially similar dimensions and to reduce the dimensional precision required in the manufacture of the grooved structure to a value compatible with industrial high speed production.

In the preferred design of the laying head, the fibre guides are fast with a portion of a sphere which has a cylindrical diametral aperture through which the grooved core is driven, the said sphere is mounted without friction on an annular holder and the said guides are uniformly distributed over a cone coaxial with the said aperture, the half angle at the apex of which is less than 45 degrees. The annular holder consists of a cylindrical ring parallel with the diametral plane of the sphere perpendicular to the axis of the aperture, and maintained fast with a frame. The latter is either fixed or rotatable depending on the grooved core feed being either translational or helical.

In a variant design, the fibre guides are fast with a hollow cylinder and distributed along a cone coaxial with the cylinder, the said cylinder being supported by a member fast with a fixed frame by means of a double row ball bearing.

In accordance with another variant, each fibre guide is fast with a trapezium shaped mount, all of the said mounts being distributed along radii of a common cylinder coaxial with a cylindrical guide through which the grooved core is driven. Individual positioning means are provided to adjust the position of each mount rotatably mounted on a fixed pin.

The invention provides means for an optical control of the angular position of the laying head.

BRIEF DESCRIPTION OF THE DRAWINGS

The invention will be readily understood from the following description and by reference to the accompanying figures, which are given by way of non limiting example and in which.

DETAILED DESCRIPTION OF THE INVENTION

Figure 1:
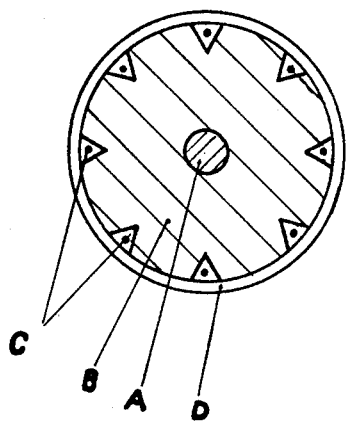
FIG. 1 is a sectional view of a finished cable element.

The present invention concerns more particularly the laying of optical fibres in a cable element, which may serve as an independent cable after sheathing by the necessary protective envelopes which consists, as diagrammatically illustrated in the section of FIG. 1, of a mechanically rigid core A coated with a star-shaped dielectric structure B, the spaces between the arms of the star consisting of helical grooves along the core A–B. The optical fibres C are freely laid in the grooves B and a tape D externally bounds the grooves B. Such elements may be assembled for the purpose of forming a complex transmission cable comprising, where desired, also metallic conductors. This assembly is completed by sheaths and envelopes as well known.

The invention concerns means for continuously laying the fibres C in the grooves in B without any danger of breakage of the fibres or the introduction of stresses which would result in losses in transmission of the optical energy along the fibres.

Figure 2:
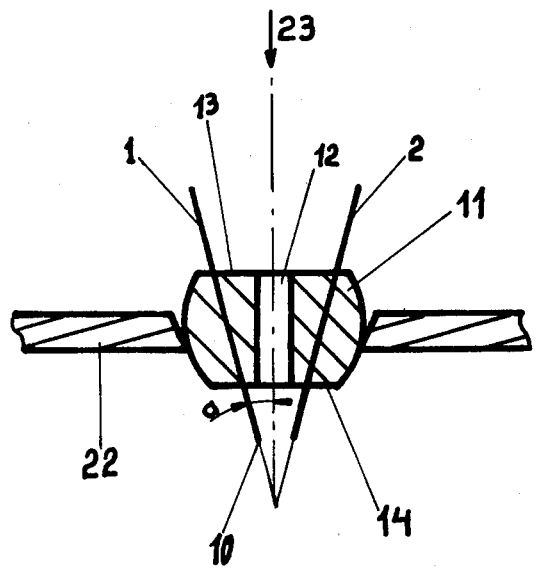
FIG. 2 is an axial sectional diagram of a first design of mount for the fibre guides.
Figure 3:
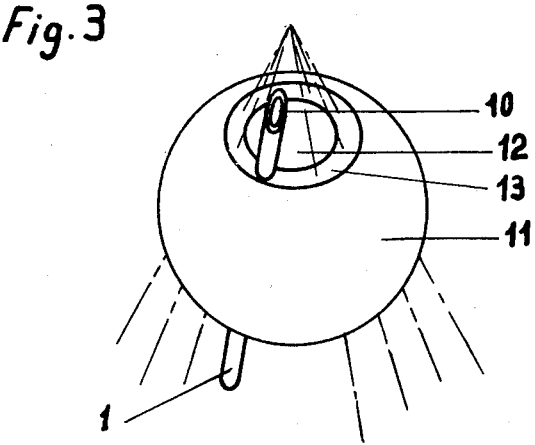
FIG. 3 is an isometric view of the said design.

FIG. 2 is a sectional view and FIG. 3 a view in perspective of a preferred variant laying head. Fibre guides 1, 2, etc . . . consist of hollow cylindrical metallic conductors, for example of the type used as needles for intramuscular injections, having a bevel 10 at one of their ends. The said fibre guides are maintained in a mount 11 consisting of a solid member in the form of a sphere, of which two parallel sections have been eliminated so as to form two parallel plane faces 13 and 14, in which there has been machined a cylindrical central aperture 12 perpendicular to the faces 13 and 14. The fibre guides 1, 2, etc . . . are introduced through apertures formed for this purpose within the mount 11, along the generating lines of a cone whose axis 23 is the same as that of the aperture 12. When required by the type of the optical fibres, the wall of the central channel of the fibre guide is coated with a film to facilitate the travel of the fibres, for example a Teflon coating when the fibre guides consist of steel. FIG. 3 shows only one fibre guide 10, seven other guides being diagrammatically represented by broken lines. It is to be understood that the number of fibre guides depends only upon the type of cable to be manufactured. In the case of the example illustrated in FIG. 1, the cable element incorporates eight fibres. The guides are fixed in the mount 11 by adhesive bonding in the plane of the face 13. It is to be understood that these features have no limiting character and apply only to one particular example. The mount 11 is supported by a ring 22 shown in FIG. 2. This ring has a conical inner face so that the contact between 11 and 22 can take place along a concentric circle with minimum friction to enable the mount 11 to turn freely in the said ring. In practice, the member 11 consists of Teflon and the ring 22 of ground hardened steel, or conversely the mounting 11 consists of polished hardened steel and the ring 22 of Teflon. It is known that the coefficient of friction of such surfaces is 0.09. The diameter of stainless steel fibre guides is made such as to enable them to penetrate into the grooves of the core and the diameter of their central channel is made such that the fibre to be laid can be threaded therethrough. This choice, and that of the inclination of the guides in relation to the axis of the core, makes it possible to obtain a pressure of the guides which is sufficient to ensure contact between the guide end and the bottom of the groove even in the event of variation of the diameter of the core or irregularity of the groove. In a particular construction, the external diameter of the fibre guides is 0.6 mm, the length between the end of the contact with the bottom of the groove and the fixing point in the mount 11 is 7 mm and the inclination a of the guides in relation to the axis of the mount is about 30 degrees.

Figure 4:
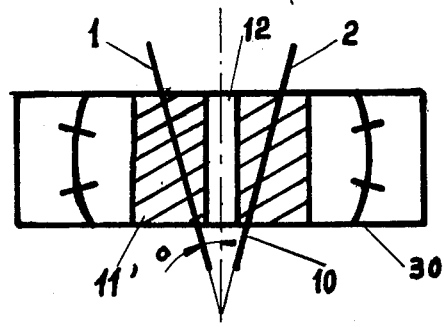
FIG. 4 is an axial sectional diagram of a second design.

The embodiment of FIG. 4 differs essentially from that just described by the fact that the freedom of rotation of the mount 11 for the fibre guides 1, 2, etc . . . is ensured, not by the frictionless contact between spherical and conical surfaces, but by a double row ball bearing, which is diagrammatically represented at 30. In this embodiment, the fibre guides 1, 2, etc . . . are mounted in the thickness of the wall of a cylindrical mount 11' having a central aperture 12 intended for the passage of the cable core. The freedom of movement of the mount, and consequently of the fibre guides, in relation to a fixed reference is necessary in order to follow any fluctuation in the position of the cable core such as the rotation of this core.

Figure 5:
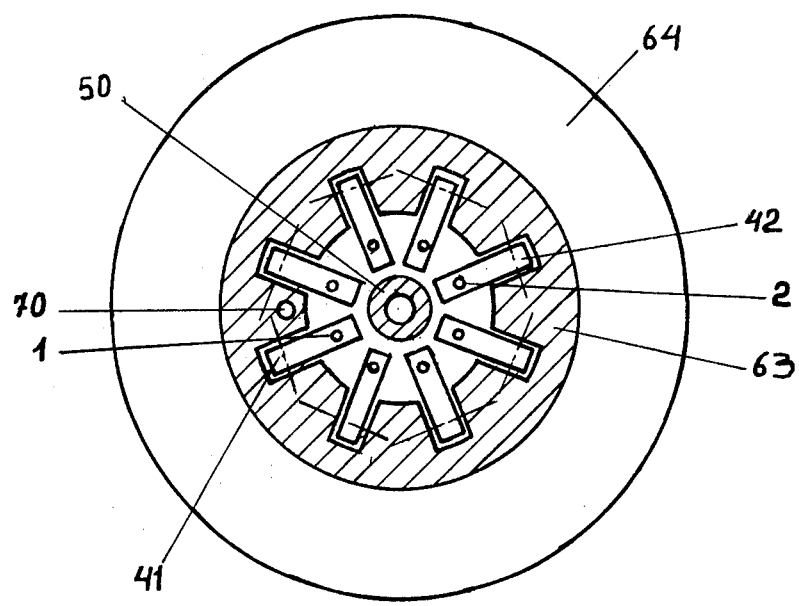
FIGS. 5 and 6 are an elevational view and a sectional view respectively of a third variant of the invention.
Figure 6:
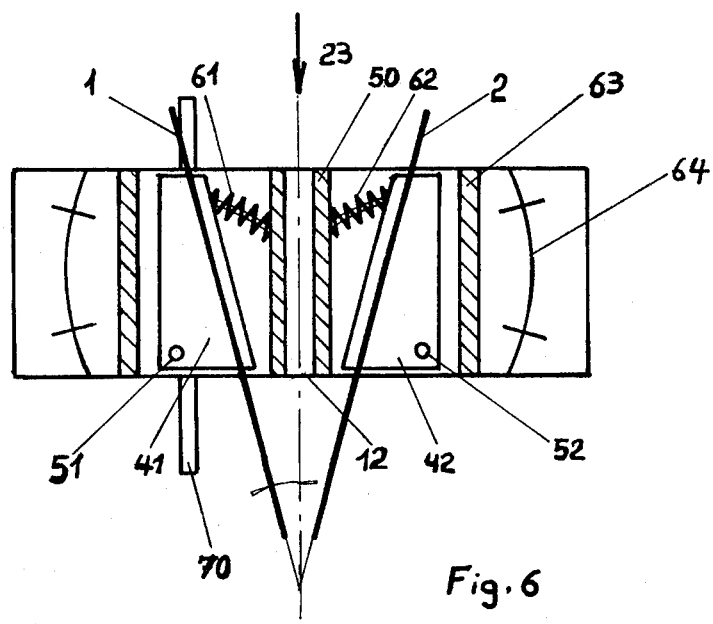

In the variant illustrated in FIGS. 5 and 6, each of the fibre guides is associated with an independent mount. As shown, each of the fibre guides such as 1, 2 is fast with a parallelepipedic mounting 41, 42, etc . . . These mountings are regularly distributed around a hollow cylinder 50 serving as a guide for the cable core (A-B of FIG. 1). These mounts are fixed by a pin 51, 52, etc . . . to a stationary frame, so that it is possible to set independently the inclination a of each of the fibre guides in relation to the axis of the central aperture 12 of the guide 50. A return spring 61, 62, etc . . . creates the antagonistic couple necessary for the return of the associated mount into position when the latter is caused to pivota about its fixed pin 51, 52, etc . . . , for example under the action of a thrust exerted on the end of the fibre guide. The individual mounts 41, 42, etc . . . are positioned in an annulus 63, of which the inner face is formed with recesses to receive the said individual mountings. The annulus 63 is fast with a needle bearing 64, which ensures freedom of movement of all the mountings.

Figure 7:
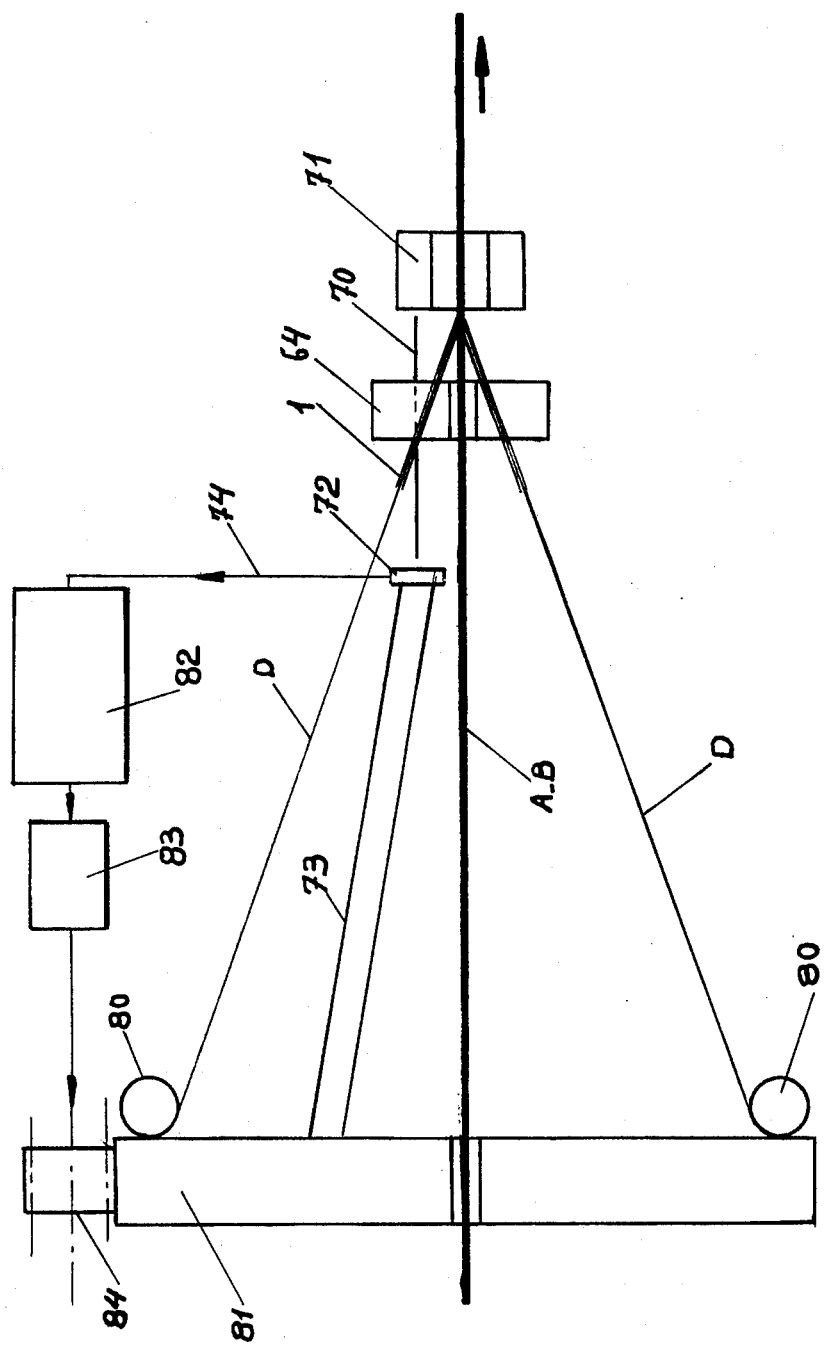
FIG. 7 is a diagram of the fibre laying station.

FIG. 7 is a diagram of the fibre laying station in a production line for cable elements according to FIG. 1, and shows the operation of an automatic control unit of the angular position of the mount. A sensing element of this unit is shown at 70 in FIGS. 5 and 6 only, but it is to be understood that this unit may be associated with any of the mount variants. The fibre guides, such as 1, of the laying head, place a fibre such as D in each of the grooves of the translationally traveling core A-B, as indicated by the arrow. The fibres D are supplied by reels, such as 80, mounted on a plate 81 rotating at a rate of one revolution per pitch of the grooves. A control unit makes it possible to fix the angular position of the mount 64 in relation to the plate 81. It comprises essentially a light source 71 feeding a fibre light guide 70 fast with the mount of the fibre guides, as illustrated in FIG. 5. The beam of light transmitted by 70 through the mount falls upon a sensor 72 made fast with the plate 81 by the arm 73. The said sensor comprises a set of three photo-detectors, of the photo-transistor type, which are so disposed that a controlling detector is situated on the axis of the beam when the correct angular setting is achieved and the other two are symmetrically disposed. The output signal from the sensor 72 is applied by way of the lead 74 to a processing unit 82 which controls the angular setting of the plate by way of the driving unit 83. The coupling between 83 and the plate 81 is diagrammatically represented by the gearing 84.

What we claim:

1. Apparatus for simultaneously laying a number of optical fibres in a number of helical grooves in a cylindrical core continuously travelling consisting of a mount which is freely movable in a frame and is machined with a central through opening for said core a set of fibre guides consisting of resilient hollow metallic tubes terminated at one of their ends by a bevel resting under pressure on the bottom of the said grooves carried by said mount so that their inclination in relation to the direction of travel is at most equal to 45 degrees.

2. Apparatus according to claim 1, wherein said mount has the form of a sphere truncated by elimination of two sections parallel to a common diameter perpendicular to the axis of the said central opening for the core and the fibre guides are disposed along the generatrices of a cone of like axis and having an angle at the apex equal to 30 degrees, the said frame comprising a ring situated in a plane perpendicular to the said axis and having an aperture of conical section, in which the said mount rests.

3. Apparatus according to claim 1, wherein said mount has the form of a hollow cylinder resting on a stationary frame by means of a double-row ball bearing and the fibre guides are distributed along the generatrices of a cone having the same axis as the cylinder.

4. Apparatus according to claim 1, wherein the said mount comprises a set of trapezium shaped individual mounts distributed along the radii of a cylinder about a hollow cylinder serving as a guide for the grooved core, the said mounts being individually movable about an axis perpendicular to the axis of the said cylinder and each supporting a fibre guide inclined in relation to the axis of the said cylinder, the said mounts being disposed in an annulus fixed to the stationary frame by means of a needle bearing.

5. Apparatus according to claim 1, comprising a light guide disposed parallel to the direction of travel of the grooved core in said mount for the purpose of the angularly setting the said mount in relation to a plate supporting the reels feeding the optical fibres.

* * * * *